United States Patent [19]

Odaka et al.

[11] Patent Number: 4,974,100
[45] Date of Patent: Nov. 27, 1990

[54] ENDLESS TAPEDRIVE SYSTEM

[75] Inventors: Toshiya Odaka; Toshiaki Shima, both of Tokyo, Japan

[73] Assignee: Otari, Inc., Chohu, Japan

[21] Appl. No.: 244,925

[22] Filed: Sep. 15, 1988

[30] Foreign Application Priority Data

Sep. 21, 1987 [JP] Japan .................. 62-237880

[51] Int. Cl.⁵ .............................................. G11B 5/008
[52] U.S. Cl. .......................................... 360/90; 360/15
[58] Field of Search ................. 360/91, 90, 93, 15–17, 360/130.21, 130.2, 91; 242/55.19 A

[56] References Cited

U.S. PATENT DOCUMENTS

| | | | |
|---|---|---|---|
| 2,908,767 | 10/1959 | Fritzinger | 360/15 |
| 3,340,369 | 9/1967 | Seidl | 242/55.19 A |
| 3,942,190 | 3/1976 | Detwiler | 360/90 X |
| 4,016,602 | 4/1977 | Giolitti et al. | 242/55.19 A X |
| 4,293,881 | 10/1981 | Mason | 360/90 X |
| 4,652,941 | 3/1987 | Pfannkuch | 360/15 |
| 4,695,003 | 9/1987 | Moris | 242/55.19 A |

FOREIGN PATENT DOCUMENTS 0104253  5/1988  Japan ..................... 360/15

Primary Examiner—Robert S. Tupper
Assistant Examiner—Andrew L. Sniezek
Attorney, Agent, or Firm—David O'Reilly

[57] ABSTRACT

A tape running device for storing and running an endless magnetic tape for mass-producing copies of the endless magnetic tape. The tape running device comprises a tape storage mechanism for storing a long, endless magnetic tape along a zigzag path formed by a plurality of movable guide rollers, a tension control mechanism for maintaining tension in the endless magnetic tape stored in the tape storage mechanism at a predetermined tension level, and tape driving apparatus for driving the endless magnetic tape stored in the tape storage mechanism. The total length of the zigzag path along which the endless magnetic tape is extended in the tape storage mechanism can be varied by properly shifting the plurality of guide rollers so that the tension in the endless magnetic tape is maintained on a predetermined tension level while the endless magnetic tape is being driven. Accordingly, the tape running device is capable of storing an endless magnetic tape at a predetermined tension and capable of driving the endless magnetic tape without turning the tape over and without creasing the endless magnetic tape regardless of the length of the endless magnetic tape.

2 Claims, 3 Drawing Sheets

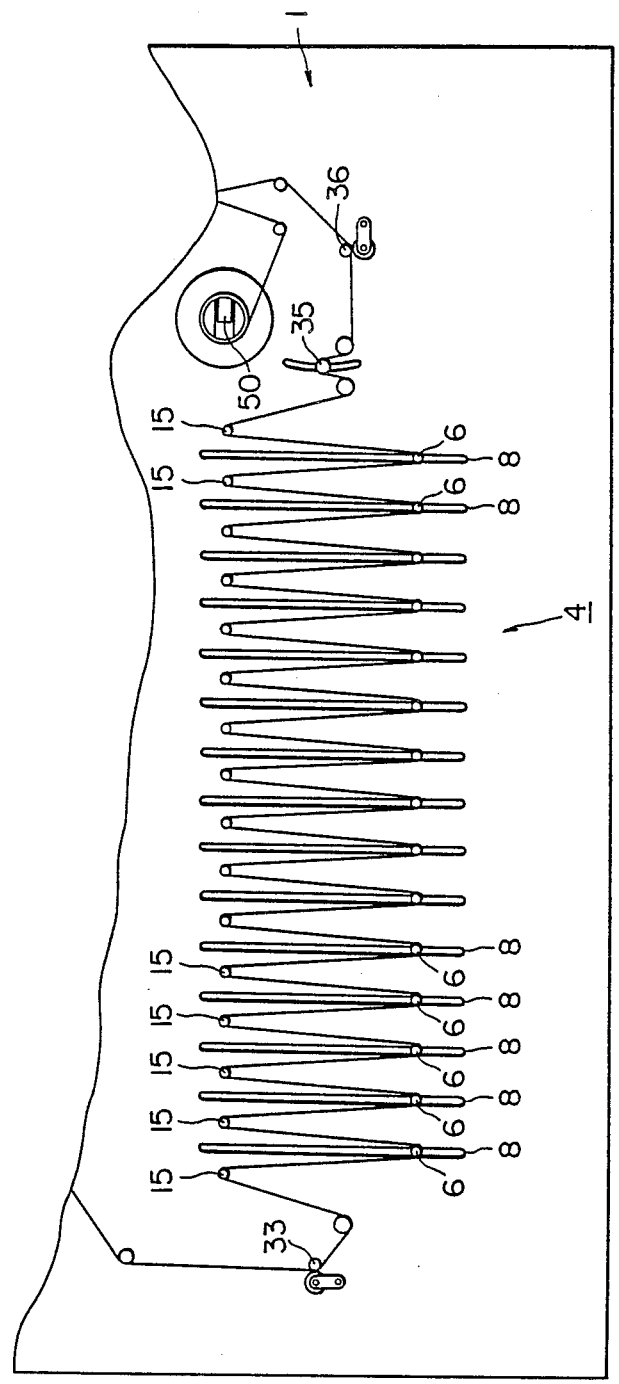

ENDLESS TAPEDRIVE SYSTEM

BACKGROUND OF THE INVENTION

1. Field of the Invention

The present invention relates to a tape running device for running an endless magnetic tape and, more particularly, to a tape running device useful particularly for mass-producing the duplicate magnetic tapes of a mother magnetic tape.

2. Description of the Prior Art

A tape running device capable of running an endless mother magnetic tape is necessary for mass-producing the duplicate magnetic tapes of the mother magnetic tape by recording data recorded in the mother magnetic tape in virgin magnetic tapes.

Japanese Patent Laid-open (Kokai) No. 62-57154 discloses a magnetic tape running device for running an endless magnetic tape.

Japanese Patent Laid-open (Kokai) No. 62-139108 discloses another magnetic running device for running an endless magnetic tape, provided with a plurality of guide rollers.

These known magnetic tape running devices each has a tape storage chamber provided with a tape outlet opening and a tape inlet opening, for storing the most portion of a long, endless magnetic tape in a zigzag arrangement. The endless magnetic tape is pulled out from the tape storage chamber through the tape outlet opening and is returned through the tape inlet opening into the tape storage chamber to run the endless magnetic tape repeatedly.

The former known type running device has the following drawbacks.

First, it is possible that the magnetic tape is turned over in drawing out the magnetic tape from the tape storage chamber, because the magnetic tape is stored in the tape storage chamber in random layers, but the magnetic tape is rarely turned over in a practical tape running operation when the magnetic tape has a sufficiently large width on the order of 12.8 mm and a thickness greater than 50 $\mu$m, and the tape storage chamber is designed properly, because such a magnetic tape is strong enough to resist a force tending to turn the magnetic tape over. However, a magnetic tape having a small width on the order of 8 mm or 3.8 mm and a thickness on the order of 18 $\mu$m is turned over frequently, because such a narrow and thin magnetic tape is scarcely resistant to a force tending to turn over the magnetic tape.

Secondly, since the magnetic tape is folded zigzag in the tape storage chamber, the magnetic tape is liable to be creased when the magnetic tape is pulled suddenly at a high pulling speed. Although insignificant in low-density recording, creases in the magnetic tape are significant problem in high-density recording, and the magnetic tape must not be creased in high-density recording.

The latter know tape running device provided with a plurality of guide rollers for guiding an endless magnetic tape for storage in the tape storage chamber is designed to deal with a magnetic tape having a sufficiently high tensile strength. A narrow and thin magnetic tape, such as a magnetic tape having a width on the order of 3.8 mm or 8 mm and a thickness on the order of 18 $\mu$m, will be exposed to an excessive tensile force. Furthermore, the length of the endless magnetic tape which can be stored in this tape running device is fixed, and the tape running device is unable to deal with variation in the length of the magnetic tape.

SUMMARY OF THE INVENTION

Accordingly, it is an object of the present invention to provide a tape running device capable of running a magnetic tape properly without turning the magnetic tape over and without creasing the magnetic tape.

It is another object of the present invention to provide a tape running device capable of dealing with an endless magnetic tape of an optional length.

To achieve the objects of the invention, the present invention provides a tape running device comprising: tape storage means for storing an endless magnetic tape in a zigzag arrangement; tension control means for maintaining a predetermined tension in the magneic tape stored in the tape storage means; and driving means for driving the magnetic tape stored in the tape storage means for running.

The tension control means, in cooperation with the tape storage means, maintains a constant tension in the magnetic tape stored in the tape storage means, so that the magnetic tape are arranged orderly in the tape storage means.

BRIEF DESCRIPTION OF THE DRAWINGS

The above and other objects, features and advantages of the present invention will become apparent from the following description taken in conjunction with the accompanying drawings, in which:

FIG. 3 is a fragmentary front elevation showing an essential portion of a tape running device in a second embodiment according to the present invention.

DETAILED DESCRIPTION OF THE PREFERRED EMBODIMENTS

Figure 1:
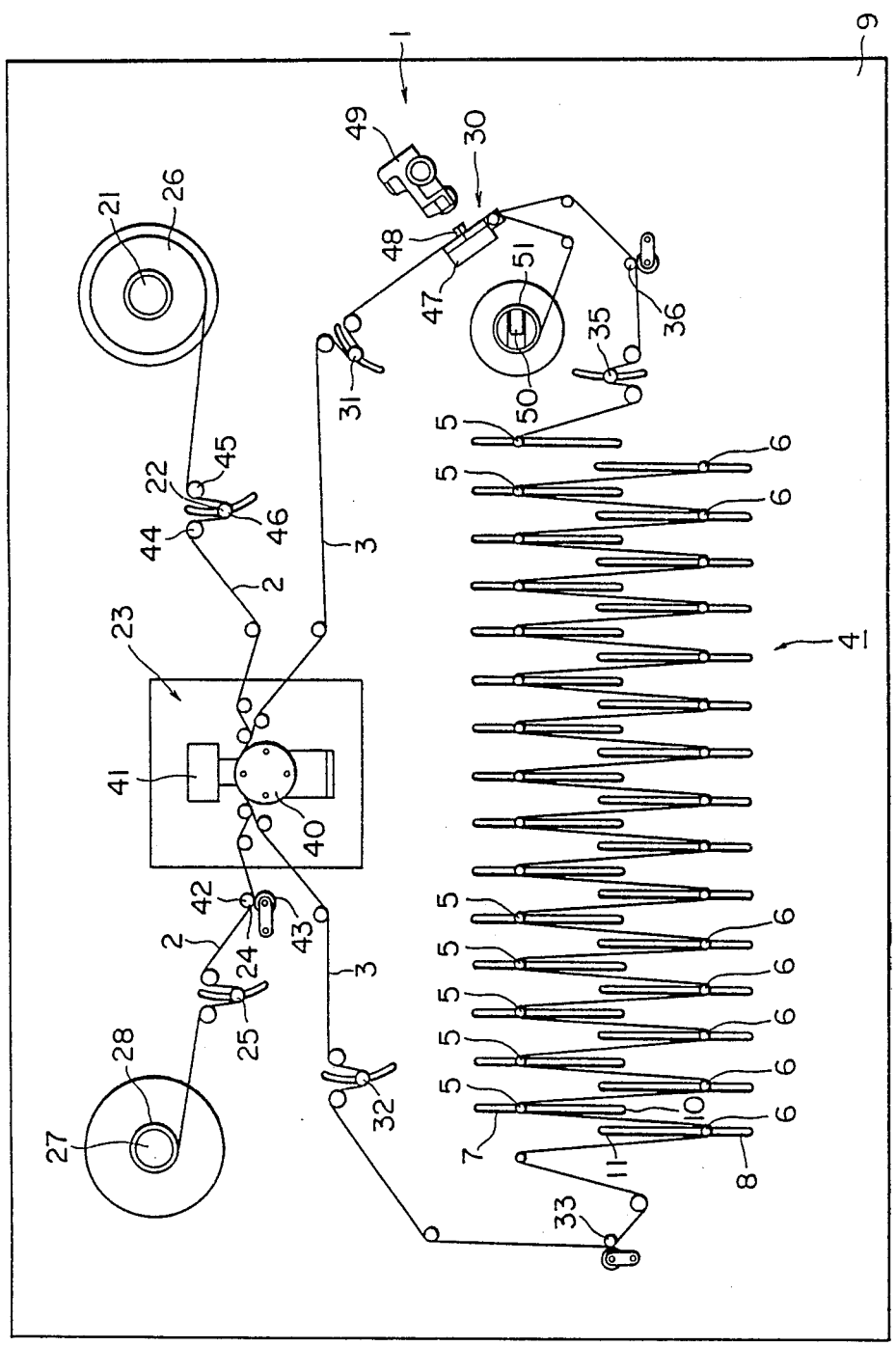
FIG. 1 is a front elevation of a copying apparatus incorporating a tape running device in a first embodiment according to the present invention.
Figure 2:
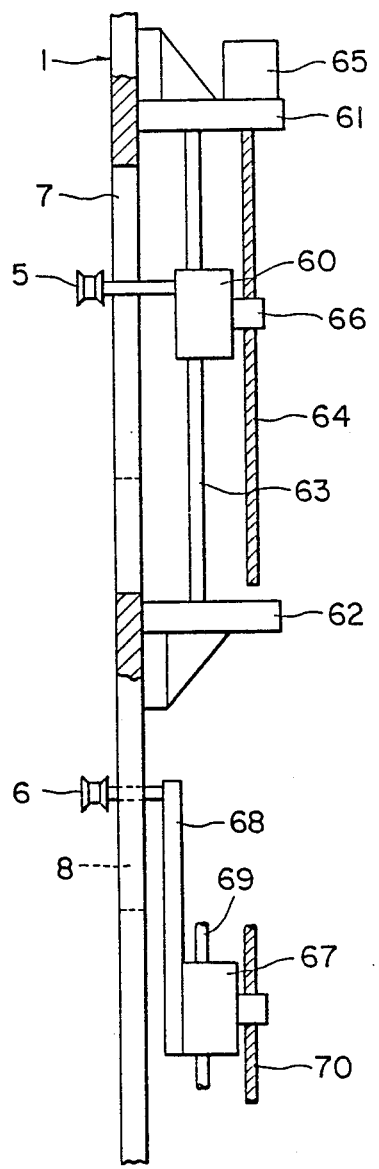
FIG. 2 is a fragmentary side elevation partly in section of the tape running device of FIG. 1.

First Embodiment (FIGS. 1 and 2)

Referring to FIG. 1 showing a copying apparatus 1 incorporating a tape running device in a first embodiment according to the present invention, a copying tape 2, namely, a virgin magnetic tape, runs in the upper section of the copying apparatus 1, and a mother tape 3, namely, a magnetic tape carrying information to be copied, runs in the lower section of the copying apparatus 1.

The copying tape 2 unwound from a feed reel 26 mounted on a feed reel mount 21 runs via a tension device 22, a printing section 23, a driving mechanism 24 and a tension device 25, and is wound on a winding reel 28 mounted on a winding reel mount 27. On the other hand, the mother tape 3 runs through a splicing station 30, a tension device 31, the printing station 23, a tension device 32, a driving mechanism 33, a tape storage mechanism 4, a tension device 35 and a driving mechanism 36.

The tape storage mechanism 4 comprises a plurality of upper guide rollers 5 and a plurality of lower guide rollers 6 respectively corresponding to the upper guide rollers 5. The upper guide rollers 5 and the lower guide rollers 6 guide the mother tape 3. Upper slots 7 and lower slots 8 are formed in a base plate 9 to receive shafts supporting the upper guide rollers 5 and shafts supporting the lower guide rollers 6, respectively. The lower portions 10 of the upper slots 7 and the upper portions 11 of the lower slots 8 overlap each other.

Referring to FIG. 2 showing an essential portion of the tape storage mechanism 4 of FIG. 1, each upper guide roller 5 is held rotatably on an upper moving block 60 slidably mounted on a vertical guide shaft 63 on the backside of the base plate 9. The vertical guide shaft 63 has an upper end held on an upper bracket 61, and a lower end held on a lower bracket 62. The internally threaded part 66 of the moving block 60 engages a screw rod 64 extending in parallel to the vertical guide shaft 63. The screw rod 64 is driven for rotation by a motor 65 mounted on the upper bracket 61. The screw rod 64 is rotated in one direction or the other by the motor 65 to move the upper moving block 60 upward or downward along the guide shaft 63. Each lower guide roller 7, similarly to the upper guide roller 6, are held rotatably on an arm 68 fixed to a lower moving block 67. The lower moving block 67 is mounted slidably on a vertical guide shaft 69, and is moved upward or downward by a screw rod 70. A mechanism for moving the lower moving block 67 is the same as that for moving the upper moving block 60, and hence the description thereof will be omitted.

Each upper guide roller 5 and the corresponding lower guide roller 6 are moved respectively in opposite directions to reduce or to increase the distance between the upper guide roller 5 and the corresponding lower guide roller 6. Simultaneously with the arrival of the lower guide roller 6 at the top of the upper portion 11 of the slot 8, the upper guide roller 5 arrives at the bottom of the lower portion 10 of the slot 7, in which the lower guide roller 6 is located above the upper guide roller 5.

The printing station 23 comprises a cylindrical printing wheel 40 supported rotatably, and a nozzle 41 for blowing air against the overlapping copying tape 2 and mother tape 3 to apply a dynamic air pressure continuously to the overlapping copying tape 2 and mother tape 3 so that the copying tape 2 and the mother tape 3 are pressed against the circumference of the printing wheel 40, the copying tape 2 and the mother tape 3 overlap closely each other and both the copying tape 2 and the mother tape 3 run together without slipping relative to each other when either the copying tape 2 or the mother tape 3 is driven for running. A signal pattern recorded in the mother tape is transferred to the copying tape 2 by magnetism or heat in the printing station 23 by a conventional signal pattern transfer procedure, the description of which will be omitted.

The driving mechanism 24 comprises a capstan 42, a pinch roller 43 which can be pressed against or moved away from the capstan 42, and a motor, not shown, for driving the capstan 42. The copying tape 2 is pinched between the capstan 42 and the pinch roller 43 and is driven for running by the capstan 42.

The driving mechanisms 33 and 36 for driving the mother tape 3 may be the same in construction as the driving mechanism 24. The driving mechanism 24 drives the copying tape 2, and thereby the mother tape 3 is caused to run together with the copying tape 2. The tension device 22 comprises a pair of guide rollers 44 and 45, and a swing roller 46 disposed for swing motion between the guide rokllers 44 and 45. The swing roller 46 is supported on a swing arm, not shown, urged in one direction by a spring, not shown. The operating position of the swing roller 46 is dependent on the tension in the copying tape 2. Therefore, the tension in the copying tape 2 can be detected through the detection of the operating position of the swing roller 46. The tension devices 25, 31, 32 and 35 may be the same in construction as the tension device 22.

The splicing station 30 comprises a splicing table 47, a cutter 48 and a splicing unit 49. At the beginning of the copying operation, the mother tape 3 is wound on a reel 51 mounted on a mother tape reel mount 50. The leading end and trailing end of the mother tape 3 are spliced at the splicing station 30 to make the mother tape 3 endless. The leading end of the mother tape 3 unwound from the reel 51 is placed over the trailing end of the mother tape 3 on the splicing table 47 after being passed through the splicing station 30, the printing station 23 and the storage mechanism 4. Then, the leading end and trailing end of the mother tape 3 overlapping each other on the splicing table 47 are cut by the cutter 48. Then, the leading edge and trailing edge of the mother tape 3 are placed in abutment, and then the mother tape 3 is spliced by by splicing unit 49.

The motor for driving the reel mount 21 is controlled on the basis of the tension in the copying tape 2 detected by the tension device 22 so that the tension in the copying tape 2 between the reel mount 21 and the printing station 23 is maintained at a fixed level. The motor for driving the reel mount 27 also is controlled on the basis of the tension in the copying tape 2 detected by the tension device 22.

The driving mechanism 33 operates on the basis of the tension in the mother tape 3 detected by the tension device 32. The driving mechanism 36 operates on the basis of the tension in the mother tape 3 detected by the tension device 31. The distance between the level of the upper guide rollers 5 and that of the lower guide rollers 6 is regulated on the basis of the tension in the mother tape 3 detected by the tension device 35. Thus, the tension in the copying tape 2 is maintained on a fixed level on the opposite sides of the printing station 23, and the tension in the mother tape 3 in the storage mechanism 4 is maintained on a fixed level.

The tension devices 22, 25, 31, 32 and 35, the reel mounts 21 and 27, the driving mechanisms 33 and 36 and the storage mechanism 4 function in combination as a tension control mechanism.

The operation of the tape running device shown in FIG. 1 will be described hereinafter.

In an initial state, the copying tape 2 and the mother tape 3 are wound respectively on the feed reel 26 and the reel 51. The upper guide rollers 5 are positioned at the bottoms of the corresponding slots 7, while the lower guide rollers 6 are positioned at the tops of the corresponding slots 8.

First, the leading end of the copying tape 2 is unwound from the feed reek 26, is passed through the printing station 23, and is wound on the winding reel 28.

Then, the leading end of the mother tape 3 is unwound from the reel 51, is passed through the splicing station 30, the printing station 23 and the storage mechanism 4 in that order, and then the leading end of the mother tape 3 is returned to the splicing station 30.

Then, the driving mechanism 33 is actuated to unwind the mother tape 3 from the reel 51. The mother tape 3 unwound from the reel 51 is drawn into the storage mechanism 4. While the mother tape 3 is being drawn into the storage mechanism 4, the tension device 35 detects the tension in the mother tape 3, and the upper guide rollers 5 are moved upward and the lower guide rollers 6 are moved downward according to the tension in the mother tape 3 detected by the tension device 35 as the mother tape 3 is drawn into the storage mechanism 4. After the mother tape 3 has been unwound from the reel 51 by a predetermined length, the mother tape 3 is cut by the cutter 48, and then the mother tape 3 is spliced in an endless tape. Then, the endless mother tape 3 is released from the splicing station 30 and the driving mechanism 36 is actuated to adjust the tension in the mother tape 3 between the driving mechanism 36 and the printing station 23. Then, the driving mechanism 24 is actuated to run the copying tape 2 together with the mother tape 3.

Second Embodiment (FIG. 3)

A tape running device in a second embodiment according to the present invention is substantially the same in construction as the tape running device in the first embodiment, except that the storage mechanism 4 of the second embodiment is provided with upper guide rollers 15 arranged in a line on a fixed level, and the upper guide rollers 15 are not movable in vertical directions. Therefore, the range of vertical movement of the lower guide rollers 6 in the second embodiment is greater than that of the lower guide rollers in the first embodiment. However, the tape running device in the second embodiment is more simple in construction than the tape running device in the first embodiment, because the upper guide rollers 15 need not be moved.

As is apparent from the foregoing description, the tape running device according to the present invention is capable of steadily running a long, endless magnetic tape without turning over and without creasing the endless magnetic tape regardless of the length of the endless magnetic tape.

Although the invention has been described in its preferred forms with a certain degree of particularity, obviously many changes and variations are possible therein, It is therefore to be understood that the present invention may be practiced otherwise than specifically described herein without departing from the scope and spirit thereof.

What is claimed is:

1. A tape running device for running an endless magnetic tape comprising;

tape storage means for storing an endless magnetic tape in a zigzag path; said tape storage means comprised of numerous guide rollers for guiding and storing said magnetic tape; said numerous guide rollers forming a pair of substantially parallel rows with corresponding guide rollers of each row being offset from one another to form a continuous zigzag path for storing said endless magnetic tape, the length of endless magnetic tape being stored depending upon the amount of displacement between the substantially parallel rows of numerous guide rollers forming said zigzag path; variable displacement means for selectively varying the amount of displacement between said respective rows of numerous guide rollers whereby the length of the tape storage path may be selectively changed to increase or decrease the amount of endless magnetic tape being stored; tension control means for maintaining the tension of said magnetic tape in the tape storage means at a predetermined tension; and tape driving means for driving said endless magnetic tape stored in said tape storage means.

2. The tape running device according to claim 1 wherein one row of numerous guide rollers is fixed and the other row of numerous guide rollers includes means for moving the respective numerous guide rollers toward or away from the fixed row.

* * * * *